United States Patent [19]

Kossmann et al.

[11] Patent Number: 4,636,548

[45] Date of Patent: Jan. 13, 1987

[54] BINDERS FOR AQUEOUS PRIMERS FOR WOOD PAINTS

[75] Inventors: Heribert Kossmann, Ludwigshafen; Lothar Matthaei, Weisenheim; Gregor Ley, Wattenheim; Eckehardt Wistuba, Bad Durkheim; Savas Wulgaris, Ludwigshafen, all of Fed. Rep. of Germany

[73] Assignee: BASF Aktiengesellschaft, Ludwigshafen, Fed. Rep. of Germany

[21] Appl. No.: 820,003

[22] Filed: Jan. 21, 1986

[30] Foreign Application Priority Data

Jan. 30, 1985 [DE] Fed. Rep. of Germany ....... 3502944

[51] Int. Cl.$^4$ .............................................. C08K 3/22
[52] U.S. Cl. .................................................... 524/524
[58] Field of Search ......................................... 524/524

[56] References Cited

U.S. PATENT DOCUMENTS

| | | | |
|---|---|---|---|
| 3,037,952 | 6/1962 | Jordan, Jr. et al. ................. | 524/524 |
| 3,847,857 | 11/1974 | Haag et al. . | |
| 3,930,073 | 12/1975 | Drelich et al. ........................ | 524/28 |
| 4,143,153 | 3/1979 | Pommer et al. ..................... | 514/499 |
| 4,199,400 | 4/1986 | Bakule et al. ........................ | 524/524 |
| 4,404,196 | 9/1983 | Daudt et al. .......................... | 514/63 |

FOREIGN PATENT DOCUMENTS 2129823 5/1984 United Kingdom ................ 524/524

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

Binders for aqueous primers for wood paints contain
(A) from 50 to 95% by weight, based on the weight of the primer, of an aqueous dispersion of a vinyl polymer having a particle size of from 0.03 to 0.5 $\mu$m and a minimum film-forming temperature of from 0° to 50° C., the said dispersion being stable to polyvalent ions, and
(B) from 5 to 50% by weight, based on the weight of the primer, of a water-soluble polymeric zinc amine complex of a copolymer which has a K value of from 8 to 40 and consists of
 (a) from 20 to 60% by weight, based on the weight of the copolymer, of an $\alpha,\beta$-monoethylenically unsaturated mono- and/or dicarboxylic acid of 3 to 5 carbon atoms and
 (b) from 40 to 80% by weight, based on the weight of the copolymer, of styrene and/or one or more alkyl (meth)acrylates, where alkyl is of 1 to 8 carbon atoms, the copolymer being reacted with from 2 to 6 moles, based on the carboxyl groups of the copolymer, of ammonia and from 0.8 to 1.2 equivalents of a zinc compound per carboxyl group of the copolymer.

1 Claim, No Drawings

BINDERS FOR AQUEOUS PRIMERS FOR WOOD PAINTS

The present invention relates to primers for wood paints, the said primers preventing bleeding of the wood constituents.

It is known that wood constituents, such as tannin and lignin, which are present in woods such as redwood, cedar, mahogany and merbau, lead to the formation of spots on topcoats, e.g. finishes, particularly under the action of moisture. To prevent this, insulating layers, e.g. primers, are applied to the surface of the wood before coating. To date, polyurethane and epoxy resin coating materials have successfully been used as binders for such primers. However, these coating systems are toxic and are frequently processed with the addition of solvents which pollute the environment. Furthermore, some systems of this type take a very long time to dry, so that the topcoat can only be applied after a relatively long drying period.

Moreover, U.S. Pat. No. 3,847,857 discloses aqueous coats intended to prevent spot formation in coatings on wood. These coats are based on water-dilutable vinyl polymers which contain amino or quaternary ammonium groups and in some cases can be mixed with polyvalent metal ions, such as chromium, tungsten, boron and molybdenum ions, and toxic compounds, such as chromates. However, because they yellow when exposed to weathering, the products of this type can only be used in primers, although here too they have an unsatisfactory action in preventing spot formation.

Finally, attempts have also been made to add basic lead silicate, basic lead silicochromate and/or barium metaborate to aqueous dispersions in order to prevent spot formation in wood coatings, but these pigments are very toxic and can only be used, if at all, for high-hiding coats.

It is an object of the present invention to provide binders for primers for wood paints, which binders give transparent lightfast films which prevent bleeding of wood constituents and the resulting spot formation.

We have found that this object is achieved, and that aqueous primers for wood paints which contain, as the binder, (A) from 50 to 95% by weight, based on the weight of the primer, of an aqueous dispersion of a vinyl polymer having a particle size of from 0.03 to 0.5 μm and a minimum film-forming temperature of from 0° to 50° C., the said dispersion being stable to polyvalent ions, and (B) from 5 to 50% by weight, based on the weight of the primer, of a water-soluble polymeric zinc amine complex of a copolymer which has a K value of from 8 to 40 and consists of (a) from 20 to 60% by weight, based on the weight of the copolymer, of an α,β-monoethylenically unsaturated mono- and/or dicarboxylic acid of 3 to 5 carbon atoms and
 (b) from 40 to 80% by weight, based on the weight of the copolymer, of styrene and/or one or more alkyl (meth)acrylates, where alkyl is of 1 to 8 carbon atoms, the copolymer being reacted with from 2 to 6 moles, based on the carboxyl groups of the copolymer, of ammonia and from 0.8 to 1.2 equivalents of a zinc compound per carboxyl group of the copolymer, prevent spot formation due to bleeding of the wood constituents.

The films produced with non-toxic binders of this type are completely transparent and colorless and can be used as such or in pigmented form.

The vinyl polymer of the aqueous dispersions (A), which are generally 40–60% strength by weight, generally contains, as copolymerized units, monoolefinically unsaturated carboxylates of 4 to 12 carbon atoms, such as vinyl esters, acrylates and/or methacrylates, and vinylaromatic compounds, especially styrene and/or vinyl halides and/or vinylidene halides, in particular vinyl chloride and/or vinylidene chloride. Particularly suitable monoolefinically unsaturated carboxylates are methyl acrylate and methacrylate, ethyl acrylate and methacrylate, n-butyl acrylate and methacrylate, isobutyl acrylate, 2-ethylhexyl acrylate and methacrylate and vinyl acetate, vinyl propionate and/or vinyl hexanoate. Particularly interesting vinyl polymers are copolymers of acrylates with styrene or vinyl esters, and of acrylates with methyl methacrylate or vinyl chloride and/or vinylidene chloride. Copolymers of this type may furthermore contain, as copolymerized units, minor amounts, i.e. not more than about 20% by weight, of acrylonitrile and not more than about 5% by weight of monoolefinically unsaturated mono- and/or dicarboxylic acids, generally of 3 to 5 carbon atoms, or their amides, in particular acrylic acid, methacrylic acid, acrylamide, methacrylamide and fumaric acid and/or itaconic acid. In some cases, other suitable comonomers are hydroxyl-containing acrylates, such as 2-hydroxyethyl acrylate and methacrylate and 3-hydroxypropyl acrylate and methacrylate, these being used in amounts of not more than about 5% by weight, based on the copolymers. Finally, other suitable comonomers for vinyl polymers based on vinyl chloride and/or vinylidene chloride are vinylsulfonic acid and/or its water-soluble salts, such as sodium vinylsulfonate, these comonomers being used in amounts of about 0.5–2% by weight, based on the vinyl polymer. The vinyl polymers should have a particle size of from 0.03 to 0.5 μm, in particular from 0.075 to 0.25 μm and a minimum film-forming temperature of from 0° to 50° C., in particular from 5° to 25° C. The aqueous dispersions of the vinyl polymers should be stable to polyvalent ions and may be prepared in a conventional manner.

Vinyl polymer dispersions of this type are also available commercially and, in order to achieve stability to polyvalent metal ions, generally contain from 0.75 to 5, preferably from 1 to 2.5%, by weight, based on the polymer, of ionic and/or nonionic emulsifiers from the group consisting of the reaction products of fatty alcohols and p-alkylphenols with ethylene oxide. The sulfonated products of the reaction products of ethylene oxide with p-alkylphenols are also used. The degree of oxyethylation is in general from 8 to 35, and the alkyl radical of the fatty alcohols and of the alkylphenols generally contains 8 to 25 carbon atoms.

The amount of component (A), in the form of an aqueous polymer dispersion of about 50% strength, is preferably from 75 to 90% by weight, based on the total primer.

The water-soluble polymeric zinc amine complex (B) is generally used in the form of a 20–60, in particular 30–45%, strength by weight aqueous solution, the K value of the copolymer being in general from 8 to 40, preferably from 10 to 25, determined in a 1% strength solution in tetrahydrofuran at 20° C. according to DIN 53,726. The copolymer moiety of the polymeric zinc amine complex is composed of (a) from 20 to 60, in particular from 25 to 50%, by weight, based on the weight of the copolymer, of an α,β-ethylenically unsaturated mono- and/or dicarboxylic acid of 3 to 5 carbon atoms, in particular acrylic acid, methacrylic acid, itaconic acid and/or fumaric acid or maleic acid, and (b) from 40 to 80, in particular from 75 to 50%, by weight, based on the weight of the copolymer, of styrene and/or one or more alkyl acrylates or methacrylates of the above type, where alkyl is of 1 to 8 carbon atoms, the copolymer being reacted with from 2 to 6, in particular from 3 to 5, moles, based on the carboxyl groups of the copolymer, of ammonia and from 0.8 to 1.2, in particular from 0.9 to 1.1, equivalents of a zinc compound per carboxyl group of the copolymer. A particularly suitable zinc compound for the preparation of the water-soluble polymeric zinc amine complex is zinc oxide, and zinc acetate, zinc carbonate and zinc hydroxide may also be used. For the preparation of the aqueous primer, the water-soluble polymeric zinc amine complex is preferably used as a roughly 40% strength aqueous solution, in an amount of from 10 to 25% by weight, based on the total primer. The aqueous solution of the polymeric zinc amine complex can be prepared, for example, by a method in which first ammonia water having a concentration of in general from 10 to 27% by weight is added to an aqueous solution of the polymer in an amount such that the molar ratio of ammonia to carboxyl groups is preferably from 3:1 to 6:1, and then the zinc compound, in particular zinc oxide, is introduced into the stirred solution. The polymer moiety of the polymeric zinc amine complex can be prepared in a conventional manner, for example by solution polymerization or polymerization in the absence of a solvent.

The novel binder for aqueous primers may furthermore contain conventional film-forming assistants, such as glycol ethers or esters, or gasoline in amounts of not more than 5%, aS well as pigments and/or fillers, such as titanium white, talc and/or chalk, up to a pigment volume concentration of 35%. The primers can be processed in a conventional manner, for example by spraying, brushing on, dipping, casting or roller-coating with a steel or rubber roller or with a roller covered with a soft absorbent material.

In the Examples which follow, parts and percentages are by weight.

EXAMPLE 1

(a) Preparation of the polymeric zinc amine complex 55.8 parts of a 25% strength aqueous ammonia solution are initially taken in a heatable pressure-tight stirred kettle, and 34.4 parts of a copolymer prepared as described in German Laid-Open Application DOS No. 3,034,171 and consisting of equal amounts of styrene and acrylic acid and having a K value of 12 are dissolved in the stirred solution. 9.7 parts of zinc oxide (RotZiegel grade) are introduced, while stirring, and the kettle is closed and heated to 55° C. When this temperature is reached, stirring is continued for a further 3 hours, the pressure in the kettle is let down and the mixture is cooled to room temperature. A 45% strength aqueous solution of a polymeric zinc amine complex is obtained.

(b) Preparation of the binder 85 parts of a commercial aqueous dispersion of a copolymer of 50 parts of styrene, 48 parts of isobutyl acrylate and 2 parts of methacrylic acid, which contains from 2.5 to 4.5% by weight, based on the copolymer, of oxyethylated p-nonylphenol (degree of oxyethylation: 25) and the corresponding sulfonated product in a ratio of 1:1 as emulsifiers, are initially taken in a stirred kettle. 2.5 parts of n-butylglycol are then added in the course of 5 minutes, while stirring, after which 15 parts of the aqueous solution of the polymeric zinc amine complex prepared as described in (a) are added in the course of 10 minutes.

A 47% strength primer having a pH of 10 is obtained.

EXAMPLE 2

(a) Preparation of the polymeric zinc amine complex 28 parts of 25% strength aqueous ammonia solution are initially taken, and 34.4 parts of a copolymer prepared as described in German Laid-Open Application DOS No. 3,034,171 and consisting of 60 parts of methyl methacrylate, 15 parts of methyl acrylate and 25 parts of acrylic acid are dissolved in the stirred solution. 4.85 parts of zinc oxide (Rotsiegel) are then introduced into this solution, while stirring, and the procedure described in Example 1 under (a) is then followed.

(b) Preparation of the binder 80 parts of a 50% strength aqueous dispersion of a copolymer of 50 parts of n-butyl acrylate, 47 parts of methyl methacrylate, 1 part of acrylic acid and 2 parts of methacrylamide, which contains 4%, based on the polymer, of a 1:1 mixture of oxyethylated p-nonylphenol (degree of oxyethylation: 25) and the corresponding sulfonated product as emulsifiers, are initially taken, and 2.5 parts of n-butylglycol and 20 parts of the polymeric zinc amine complex solution prepared as described under (a) are added in succession. A primer having a solids content of 46% and a pH of 9.8 is obtained.

EXAMPLE 3

(a) Preparation of the polymeric zinc amine complex 44.75 parts of 25% strength aqueous ammonia solution are initially taken, and 34.4 parts of a copolymer prepared as described in German Laid-Open Application DOS No. 3,034,171 and consisting of 60 parts of styrene, 30 parts of acrylic acid and 10 parts of maleic anhydride and having a K value of 15 are dissolved therein. 8.9 parts of zinc oxide (Rotsiegel) are added to the solution, and the procedure described in Example 1 under (a) is then followed.

(b) Preparation of the binder 2.5 parts of n-butylglycol are added to 85 parts of a polymer dispersion as described in Example 1 under (b) in the course of 6 minutes, and 15 parts of the aqueous solution of the polymeric zinc amine complex described under (a) are introduced in the course of 15 minutes. The solids content of the resulting primer is 49% by weight and the pH is 10.2.

The binders obtained are pigmented according to the following formulation:

114 parts of 46% strength binder (initially taken for preparing a paste with the fillers and pigments),
12 parts of a 10% strength aqueous solution of sodium polyphosphate,
42 parts of water,
1 part of sodium polyacrylate (30% strength aqueous solution),
194 parts of titanium dioxide (rutile),
115 parts of 46% strength primer,
150 parts of chalk (5 μm),
10 parts of mineral spirit (boiling range from 180 to 210° C.), 5 parts of a mixture of diisobutyl adipate, succinate and glutarate,
8 parts of a thickener (25% strength aqueous solution),
5 parts of a silicone-based antifoam and
344 parts of 46% strength binder.

The pigment volume concentration of this special primer is 29%.

Testing the primers:

The primers prepared using the binders of Examples 1 to 3 are applied onto redwood, merbau and red cedar in an amount of 120 g/m². After drying for 4 hours, the primed woods are coated with an aqueous emulsion coat (pigment volume concentration 35%) in an amount of 120 g/m². The emulsion coat has the following composition:

470 parts of an aqueous 50% strength dispersion of a copolymer of 50 parts of methyl methacrylate, 48 parts of butyl acrylate and 2 parts of acrylic acid, having a minimum film-forming temperature of 14° C.,
69 parts of water,
1.2 parts of sodium polyacrylate (30% strength aqueous solution),
11.3 parts of sodium polyphosphate (10% strength aqueous solution),
1.5 parts of ammonia (25% strength aqueous solution),
10 parts of mineral spirit (boiling range from 180 to 215° C.),
155.7 parts of titanium dioxide (rutile),
179 parts of chalk (5 μm),
61 parts of talc (5 μm),
119 parts of cellulose ether (1% strength aqueous solution),
0.8 part of a polyurethane-based thickener (15% strength aqueous solution),
10 parts of a mixture of diisobutyl adipate, succinate and glutarate, and
2.5 parts of a silicone-based antifoam.

After storage for 24 hours at room temperature, the coated woods are each placed in water for 48 hours.

For comparison, the woods of the stated types are primed with a 50% strength aqueous dispersion of a copolymer of 50 parts of isobutyl acrylate, 48 parts of styrene and 2 parts of methacrylic acid, the dispersion being applied in an amount of 120 g/m², and are then provided with a topcoat as described above. Finally, for further comparison, the wood specimens are coated only with the abovementioned emulsion coat, applied in an amount of 120 g/m².

In the test, spot formation in the particular topcoat and the discoloration of the water in which the coated woods are stored are assessed. The results are summarized in the Table below.

TABLE

| | Primer/binder | | | | |
|---|---|---|---|---|---|
| | Example 1 | Example 2 | Example 3 | Butyl acrylate/styrene | |
| | Topcoat | | | | |
| Woods | aqueous emulsion coats | aqueous emulsion coats | aqueous emulsion coats | aqueous emulsion coats | aqueous emulsion coats |
| Redwood | no spot formation no discoloration of the water | no spot formation no discoloration of the water | no spot formation no discoloration of the water | slight spot formation slight discoloration of the water | pronounced spot formation pronounced discoloration of the water |
| Merbau | no spot formation no discoloration of the water | no spot formation no discoloration of the water | no spot formation no discoloration of the water | pronounced spot formation pronounced discoloration of the water | very pronounced spot formation very pronounced discoloration of the water |
| Red cedar | no spot formation no discoloration of the water | no spot formation no discoloration of the water | no spot formation no discoloration of the water | slight spot formation slight discoloration of the water | pronounced spot formation pronounced discoloration of the water |

We claim:

1. A binder for aqueous primers for wood paints, which consists of
   (A) from 50 to 95% by weight, based on the weight of the primer, of an aqueous dispersion of a vinyl polymer having a particle size of from 0.03 to 0.5 μm and a minimum film-forming temperature of from 0° to 50° C., the said dispersion being stable to polyvalent ions, and
   (B) from 5 to 50% by weight, based on the weight of the primer, of a water-soluble polymeric zinc amine complex of a copolymer which has a K value of from 8 to 40 and consists of
      (a) from 20 to 60% by weight, based on the weight of the copolymer, of an $\alpha,\beta$-monoethylenically unsaturated mono- and/or dicarboxylic acid of 3 to 5 carbon atoms and
      (b) from 40 to 80% by weight, based on the weight of the copolymer, of styrene and/or one or more alkyl (meth)acrylates, where alkyl is of 1 to 8 carbon atoms, the copolymer being reacted with from 2 to 6 moles, based on the carboxyl groups of the copolymer, of ammonia and from 0.8 to 1.2 equivalents of a zinc compound per carboxyl group of the copolymer.

* * * * *